(12) United States Patent
Hara et al.

(10) Patent No.: US 6,849,354 B2
(45) Date of Patent: Feb. 1, 2005

(54) SOLID OXIDE FUEL CELL HAVING PEROVSKITE SOLID ELECTROLYTES

(75) Inventors: Naoki Hara, Kanagawa-ken (JP); Fumio Munakata, Kanagawa-ken (JP); Yasukazu Iwasaki, Kanagawa-ken (JP)

(73) Assignee: Nissan Motor Co., Ltd., Kanagawa (JP)

( * ) Notice: Subject to any disclaimer, the term of this patent is extended or adjusted under 35 U.S.C. 154(b) by 123 days.

(21) Appl. No.: 09/897,116

(22) Filed: Jul. 3, 2001

(65) Prior Publication Data

US 2002/0009628 A1 Jan. 24, 2002

(30) Foreign Application Priority Data

Jul. 4, 2000 (JP) .................................. 2000-202262
Jun. 19, 2001 (JP) .................................. 2001-184558

(51) Int. Cl.$^7$ ............................................. H01M 8/12
(52) U.S. Cl. ...................................... 429/33; 429/30
(58) Field of Search ................................. 429/30–33

(56) References Cited

U.S. PATENT DOCUMENTS 5,731,097 A * 3/1998 Miyashita et al. ............ 429/30

FOREIGN PATENT DOCUMENTS

| JP | 6-349503 | | 12/1994 |
| JP | 09-063603 A | * | 3/1997 |
| JP | 9-161824 | | 6/1997 |

OTHER PUBLICATIONS

IPDL JPO Machine Translation for JP 09–063603 A (publication date of Mar. 1997).*
Soral et al. ("Comparison of Power Densities and Chemical Potential Variation in Solid Oxide Fuel Cells with Multilayer and Single–Layer Oxide Electrolytes", J. Electrochem. Soc. vol. 145 No. 1 (1998), pp. 99–106), (Jan. 1998).*

Tatsumi Ishihara et al., "Doped $LaGaO_3$ Perovskite Type Oxide as a new Oxide Ionic Conductor", J. Am. Chem. Soc. 1994, vol. 116, No. 9, pp. 3801–3803, (no month available).

Ishihara et al., "Effects of rare earth cations doped for La site on the oxide ionic conductivity of LaGaO3–based perovskite type oxide" Solid State Ionics vol. 79 (1995) p. 147–151 (No Month).

Huang et al., "Superior Perovskite Oxide–Ion Conductor: Strontium–and Magnesium–Doped LaGaO3: II, Performance Test of Single Ceramic Fuel Cells", Journal of the American Ceramic Society, vol. 81, No. 10 (1998) (No Month) pp. 2581–2585.

Yasuda et al., "Status of Research and Development of Planar SOFC at Tokyo Gas", The 8th Symposium on Solid Oxide Fuel Cells in Japan Extended Abstracts p. 7–10 (1999) Dec.

* cited by examiner

Primary Examiner—Susy Tsang-Foster
(74) Attorney, Agent, or Firm—McDermott Will & Emery LLP

(57) ABSTRACT

A solid oxide fuel cell (SOFC) contains a first solid electrolyte layer of LaGa-based perovskite, an air electrode, a fuel electrode and a second solid electrolyte layer (having a hole transport number smaller than that of the first solid electrolyte layer), which is provided between the first solid electrolyte layer and an air electrode. Also, another SOFC contains a first solid electrolyte layer of LaGa-based perovskite, an air electrode, a fuel electrode and a third solid electrolyte layer (having electron and proton conductivity lower than that of the first solid electrolyte layer), which is provided between the first solid electrolyte layer and the fuel electrode. Still another SOFC contains the second solid electrolyte layer provided between a first solid electrolyte layer and an air electrode and the third solid electrolyte layer provided between the first solid electrolyte layer and a fuel electrode.

15 Claims, 4 Drawing Sheets

SOLID OXIDE FUEL CELL HAVING PEROVSKITE SOLID ELECTROLYTES

BACKGROUND OF THE INVENTION

1. Field of the Invention

The present invention relates to a solid oxide fuel cell (SOFC) using a perovskite solid electrolyte.

2. Description of the Related Art

Generally, an SOFC is constituted of an air electrode (cathode), a fuel electrode (anode), and a solid oxide electrolyte provided between these two electrodes. Since a high-temperature condition is required to enable the solid oxide electrolyte to exhibit ion conductivity, the SOFC is operated at a high temperature of around 1000° C. or above. However, such a high temperature operational condition results in difficulties in securing operational stability and reliability for the SOFC. In addition, since materials to be used as peripheral parts must also have high-temperature resistance, material costs have been high. Due these circumstances, studies have been conducted into the development of a material, especially a solid oxide electrolytic material, to operate the SOFC at a much lower temperature.

A recently reported LaGa-based perovskite solid electrolyte represented by a composition formula of $La_{1-x}Sr_xGa_{1-y}Mg_yO_{3-d}$ (T. Ishihara et al; J. Am. Chem. Soc., 116, 3801–3803 (1994)) exhibits excellent oxygen ion conductivity at a low temperature, and therefore has attracted attention as an electrolytic material effective for achieving low-temperature operability of the SOFC. Japanese Laid Open Patent Publication Hei 9-161824 (published in 1997) discloses an SOFC using a LaGa-based electrolyte, both a fuel and an air electrode suitable for the SOFC, and a method for fabricating the SOFC.

SUMMARY OF THE INVENTION

The LaGa-based perovskite solid electrolyte exhibits high oxygen ion conduction of the SOFC at low operation temperature, however the LaGa-based perovskite solid electrolyte transmits not only oxygen ions ($O^{2-}$) but also holes ($h^+$). In other words, the electrolyte exhibits mixed conductivity. Thus, the oxygen ion transport number is only about 90% at 600° C. In this case, reaction shown below occurs between the perovskite solid electrolyte and the respective electrodes:

[Between air electrode and solid electrolyte]

$$O_2 + 2Vo + 2e^- \Leftrightarrow 2Oo^x + 2h^+ \qquad (f\text{-}1)$$

[Between fuel electrode and solid electrolyte]

$$Oo^x + H_2 \Leftrightarrow H_2O + Vo + 2e^- \qquad (f\text{-}2a)$$

$$H_2O + Vo + 2e^- + 2h^- \Leftrightarrow H_2O + Vo \qquad (f\text{-}2b)$$

Here, Vo represents oxygen holes in the perovskite solid electrolyte; $Oo^x$ is oxygen ion fitted into the oxygen holes; $e^-$ is electrons; and $h^+$ is holes. These representations are based on Kröger-Vink defect symbolic method.

As shown in the formula (f-1), between the porous air electrode and the solid electrolyte, oxygen ($O_2$) is supplied and electrons ($e^-$) generated at the fuel electrode are supplied through an external circuit. The oxygen fits into the oxygen holes (Vo) of the solid electrolyte to become $Oo^x$ and simultaneously generates a hole ($h^+$). $Oo^x$ moves as an oxygen ion ($O^{2-}$) from the air electrode side to the fuel electrode side of the solid electrolyte via the oxygen holes Vo. Following this movement of the oxygen ion ($O^{2-}$), the oxygen hole (Vo) is moved from the fuel electrode side to the air electrode side. In addition, in cases where the solid electrolyte exhibits mixed conductivity, holes ($h^+$) generated at the air electrode side are also supplied through the solid electrolyte to the fuel electrode side.

On the other hand, as shown in the formula (f-2a), hydrogen ($H_2$) is supplied between the porous fuel electrode and the solid electrolyte. Oxygen ions ($O^{2-}$), i.e., $Oo^x$, are supplied from the air electrode side through the solid electrolyte, and then oxygen holes (Vo) and electrons ($e^-$) with water ($H_2O$).

However, as shown in the formula (f-2b), in cases where the solid electrolyte exhibits mixed conductivity, since holes ($h^+$) generated at the air electrode side also moves through the solid electrolyte to the fuel electrode side, electrons ($e^-$) generated at the fuel electrode side causes pair annihilation with the hole ($h^+$). Consequently, electrons ($e^-$) cannot be taken out into the external circuit, deteriorating the output efficiency of the SOFC.

Furthermore, the perovskite solid electrolyte may exhibit not only hole conductivity but also proton ($H^+$) and electron ($e^-$) conductivity. If the perovskite solid electrolyte exhibits proton ($H^+$) conductivity, the proton causes pair annihilation with the Oxygen ions ($O^{2-}$) generated at the air electrode side, thus deteriorating the output efficiency of the SOFC.

Also, when the SOFC having the solid electrolyte that exhibits mixed conduction operates, not only carrier contributing to electric power generation but also other carriers not contributing to electric power generation move between electrodes. Therefore an OCV (Open Circuit Voltage) of the SOFC is decreasing and the output power of the SOFC is deteriorating.

If the OCV of the SOFC in which oxygen ion transport number of the solid electrolyte is 100% is taken as E0, the $E'''o$ (i.e. OCV) of an SOFC having the solid electrolyte which exhibits mixed conduction is expressed in the formula below.

$$E'''o = t'''o\text{-}\cdot E0 \qquad (f\text{-}3)$$

Since the oxygen ion transport number: $t'''o\text{-}$ of the solid electrolyte which exhibits mixed conduction is less than 100% (i.e. $t'''o\text{-}<100\%$), the following equation is obtained.

$$E'''o < E0$$

When a load connects to the SOFC and the electric current which has current density J is provided to the load, $E'''(J)$ which is the voltage between terminals of the SOFC is expressed in the formula below if the resistance to oxygen ion conduction per unit area of the solid electrolyte is taken as $Rmo\text{-}$.

$$E'''(J) = E'''o - J \cdot Rmo\text{-} \qquad (f\text{-}4)$$

If σm and Lm represent conductivity of the solid electrolyte and the thickness thereof respectively, $Rmo\text{-}$ is expressed in the formula below.

$$Rmo\text{-} = Lm/(t'''o\text{-}\cdot \sigma m)$$

Therefore the formula (f-4) is written to the formula (f-5) below.

$$E'''(J) = t'''o\text{-}\cdot E0 - J \cdot Lm/(t'''o\text{-}\cdot \sigma m) \qquad (f\text{-}5)$$

According to the formula (f-5), the more the oxygen ion transport number: $t'''{o-}$ increases, the more output power of the SOFC is taken.

An object of the present invention is to improve the output efficiency of an SOFC by preventing the mixed conduction of the solid electrolyte and by improving the effective transport number of oxygen ions in the SOFC using perovskite solid electrolyte operated at a low temperature.

In order to achieve this object, a first aspect of a solid oxide fuel cell of the present invention is that a second solid electrolyte layer is provided between a first perovskite solid electrolyte layer and an air electrode. The second solid electrolyte layer has a smaller ratio of conduction by means of holes (i.e., a hole transport number) and higher ratio of conduction by means of oxygen ions (i.e., a oxygen ion transport number) of the conductive carriers of electrolyte such as ions, electrons, and holes than that of the first solid electrolyte layer under the operational condition of the solid oxide fuel cell.

A second aspect of the solid oxide fuel cell of the present invention is that a third solid electrolyte layer is provided between a first perovskite solid electrolyte layer and a fuel electrode. The third solid electrolyte layer has a smaller ratio of conduction by means of electrons and protons including hydrogen ions (i.e., transport numbers of electrons and protons) and higher ratio of conduction by means of oxygen ions (i.e. a oxygen ion transport number) of the conductive carriers of electrolyte such as ions, electrons, and holes than that of the first solid electrolyte layer under the operational condition of the solid oxide fuel cell.

A third aspect of the solid oxide fuel cell of the present invention is that a second solid electrolyte layer is provided between a first solid perovskite electrolyte layer and an air electrode, and a third solid electrolyte layer is provided between the first solid electrolyte layer and a fuel electrode. The second solid electrolyte layer has a smaller ratio of conduction by holes (i.e. hole transport number) and higher ratio of conduction by means of oxygen ions (i.e. oxygen ion transport number) of the conductive carriers of electrolyte such as oxygen ions, electrons, holes, and hydrogen ions than that of the first solid electrolyte layer, and the third solid electrolyte layer has a smaller ratio of conduction by electrons and protons including hydrogen ions (i.e. transport numbers of electrons and proton) and higher ratio of conduction by means of oxygen ions (i.e. oxygen ion transport number) of the conductive carriers of electrolyte such as ions, electrons, and holes than that of the first solid electrolyte layer under the operational condition of the solid oxide fuel cell.

According to each of the solid oxide fuel cells having the first to third aspects, even if the first perovskite solid electrolyte layer exhibits mixed conductivity, the presence of the second or third solid electrolyte layer with low hole, electron or proton conductivity and high oxygen ion conductivity provided between each electrode and the first solid electrolyte layer, suppresses the mixed conductivity of the entire solid electrolyte, making it possible to increase the substantial transport number of oxygen ions. An increase in polarization resistance between the electrodes caused by the reaction of the formula (f-2b) or the conduction of electrons/protons can be also suppressed. Accordingly, the output efficiency of the SOFC is improved.

DETAILED DESCRIPTION OF THE EMBODIMENTS (First Embodiment)

The SOFC of the first embodiment of the present invention has a structure where a second solid electrolyte layer having a low ratio of hole conduction (i.e. hole transport number) and a high ratio of oxygen ion conduction (i.e. oxygen ion transport number) at an operational temperature is provided between an air electrode and a perovskite solid electrolyte layer. In other words, the SOFC of the first embodiment is characterized by the use of a laminated solid electrolyte having a perovskite solid electrolyte layer and a solid electrolyte layer of a small hole transport number laminated thereon.

Figure 1A:
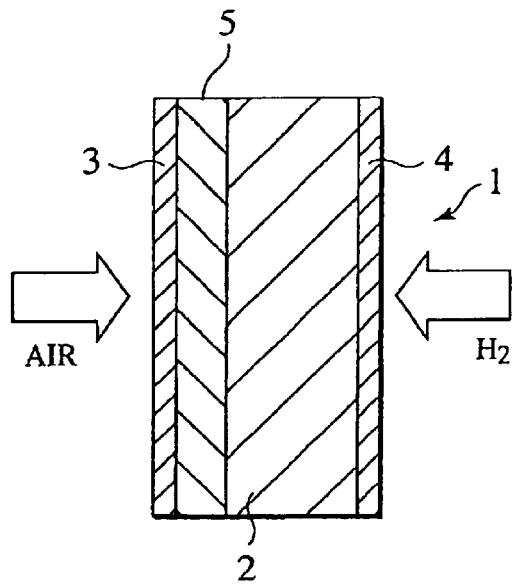
FIG. 1A is a sectional view showing the structure of an SOFC according to the first embodiment of the present invention.

FIG. 1A shows the SOFC according to the first embodiment of the present invention. As shown, the SOFC 1 of the first embodiment comprises a perovskite solid electrolyte layer 2 as a first solid electrolyte layer; a fuel electrode 4 formed on one surface of the first solid electrolyte layer; and an air electrode 3 formed on the opposite side thereof, with a second solid electrolyte layer 5 having a small hole transport number and a high oxygen ion transport number provided between the first solid electrolyte layer 2 and the air electrode 3.

In the case described here, for the first solid electrolyte layer 2, an LaGa-based perovskite compound, especially one having a composition formula of $\{(La_{2-x-y}Ln_xA_y)(Ga_{1-z}B_z)(O_{3-0.5(x+y+z)})\}$, exhibiting high oxygen ion conductivity at a low temperature, should preferably be used. Here, preferably, Ln is one or more kind of elements selected from lanthanoide elements Yb, Gd, Sm, Nd and Y; A is an one or more kinds of element selected from Sr, Ba, Ca, and so on; and B is an element of one or two kinds, selected from Mg, Zn, and so on. In addition, x should preferably be set in a range of 0.05 to 0.15; y in a range of 0.05 to 0.15; and z in a range of 0.05 or more to 0.25 or less.

For the second solid electrolyte layer 5, stabilized zirconia or a ceria based oxide can be used. For example, YSZ prepared by adding yttria (Y2O3) to zirconia (ZrO2) or CSZ prepared by adding calcia (CaO) to zirconia can be used. Other than these, stabilized zirconia prepared by adding such an oxide as samarium (Sm), scandium (Sc) or the like to zirconia can be used. Two or more kinds of oxides may be added to zirconia. As the ceria-based oxide, for example, SDC represented by $(CeO2)_{1-x}(MO1.5)_x$ can be used. Here, M is a rare earth element or Ca, and x should preferably be set in a range of 0.1 to 0.3.

Figure 1B:
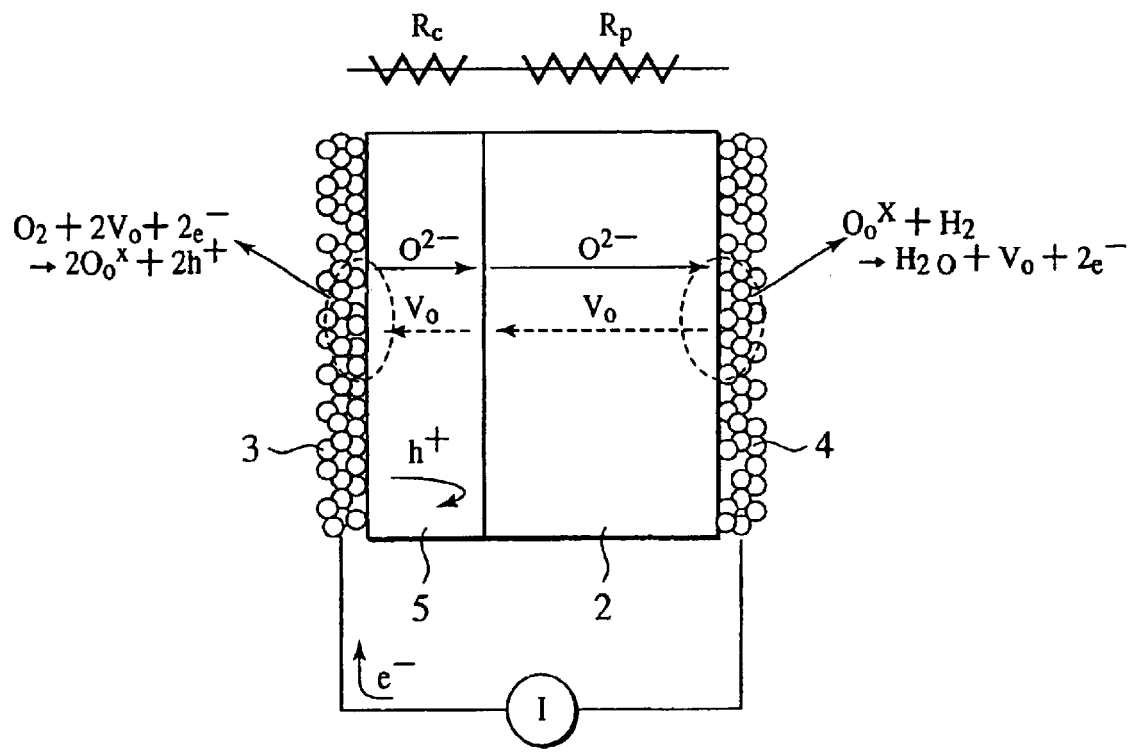
FIG. 1B is a conceptual view showing the movement of conductive carriers and the presence of resistance in a solid electrolyte according to the first embodiment of the present invention.

Preferably, the operation temperature of the SOFC should be fixed e.g. at about 600° C. or less, to enable metallic material to be used as peripheral material of the SOFC. Under such operational conditions, since the second solid electrolyte layer 5 is made of a material having a lower ratio of hole conduction, i.e., a smaller hole transport number, compared with that of the first solid electrolyte layer 2, the movement of a hole ($h^+$) generated between the air electrode and the solid electrolyte layer is suppressed by the second solid electrolyte layer 5. Thus, as shown in FIG. 1B, mixed conductivity in the entire laminated solid electrolyte is suppressed, causing oxygen ions $O^{2-}$ passed through oxygen holes Vo to be the main conductive carriers. In other words, conduction between the electrodes of conductive carriers other than oxygen ions are suppressed, enabling a substantial improvement in the oxygen ion transport number of the entire laminated solid electrolyte composed of the first and second solid electrolytes to be made. As a result, pair annihilation between electrons ($e^-$) and holes ($h^+$) as represented by a formula (f-2b) and generated at the fuel electrode side can be prevented. Accordingly, the reduction in the output efficiency of the SOFC caused by such pair annihilation can be avoided.

However, if the second solid electrolyte layer 5 is too thick, the resistance to oxygen ion conduction of the entire laminated solid electrolyte is increased and the substantial conductivity of oxygen ions is lowered. A reduction in the amount of the oxygen ion conduct deteriorates the output efficiency of the SOFC. It is therefore preferred that the thickness of the second solid electrolyte layer 5 should be fixed at such a level as to ensure lower resistance to oxygen ion conduction compared at least, with the first solid electrolyte layer 2. If the resistance of a single first solid electrolyte layer 2 to oxygen ion conduction per unit area is taken as Rp(o), and resistance of a single second solid electrolyte layer 5 to oxygen ion conduction per unit area is taken as Rc(o), the formula (f1-1) below should preferably be satisfied:

$$Rp(o) > Rc(o) \quad (f1\text{-}1)$$

Rp(o) and Rc(o) are represented respectively by the equations below:

$$Rp(o) = Lp/(tpo \cdot \sigma p)$$

$$Rc(o) = Lc/(tco \cdot \sigma c)$$

Here,
- Lp: thickness of first solid electrolyte layer
- σp: oxygen ion conductivity of first solid electrolyte layer
- tpo: oxygen ion transport number of first solid electrolyte layer
- Lc: thickness of second solid electrolyte layer
- σc: oxygen ion conductivity of second solid electrolyte layer
- tco: oxygen ion transport number of second solid electrolyte layer Thus, (f1-1) can be rewritten into the formula (f1-2) below:

$$Lp/(tpo \cdot \sigma p) > Lc/(tco \cdot \sigma c) \quad (f1\text{-}2)$$

Further, to ensure increased output efficiency compared with conventional SOFCs (which use only the first solid electrolyte layer), each thickness should preferably be adjusted in such a way as to fix the voltage-drop for the oxygen ion conduction of electrolytes, which caused by providing a second solid electrolyte 5 between a first solid electrolyte 2 and an air electrode 3, at a level lower than the OCV-drop caused by the suppression of the mixed conduction.

Here, if Ep(J), Ec(J) and Eo represent the followings respectively:
- Ep(J): voltage between electrodes for the SOFC having only the first solid eletrolyte when load current density J is provided;
- Ec(J): voltage between electrodes for the SOFC having the first and second solid eletrolytes when the load current density J is provided;
- E0: theoretical value of OCV for the SOFC According to the formula (f-5), Ep(J), Ec(J) are expressed by the following formula (f1-3), (f1-4) respectively:

$$Ep(J) = tpo \cdot E0 - J \cdot Lp/(tpo \cdot \sigma p) \quad (f1\text{-}3)$$

$$Ec(J) = tco \cdot E0 - J \cdot (Lp/(tpo \cdot \sigma p) + Lc/(tco \cdot \sigma c)) \quad (f1\text{-}4)$$

Therefore the formula below should be satisfied:

$$Ep(J) < Ec(J)$$

$$tpo \cdot E0 - J \cdot Lp/(tpo \cdot \sigma p) < tco \cdot E0 - J \cdot (Lp/(tpo \cdot \sigma p) + Lc/(tco \cdot \sigma c))$$

$$J \cdot (Lp/(tpo \cdot \sigma p) + Lc/(tco \cdot \sigma c)) - J \cdot Lp/(tpo \cdot \sigma p) < tco \cdot E0 - tpo \cdot E0$$

$$J \cdot Lc/(tco \cdot \sigma c) < (tco - tpo) \cdot E0$$

Consequently the formula (f1-5) is obtained.

$$Lc < tco \cdot \sigma c \cdot (tco - tpo) \cdot E0/J \quad (f1\text{-}5)$$

Figure 2:
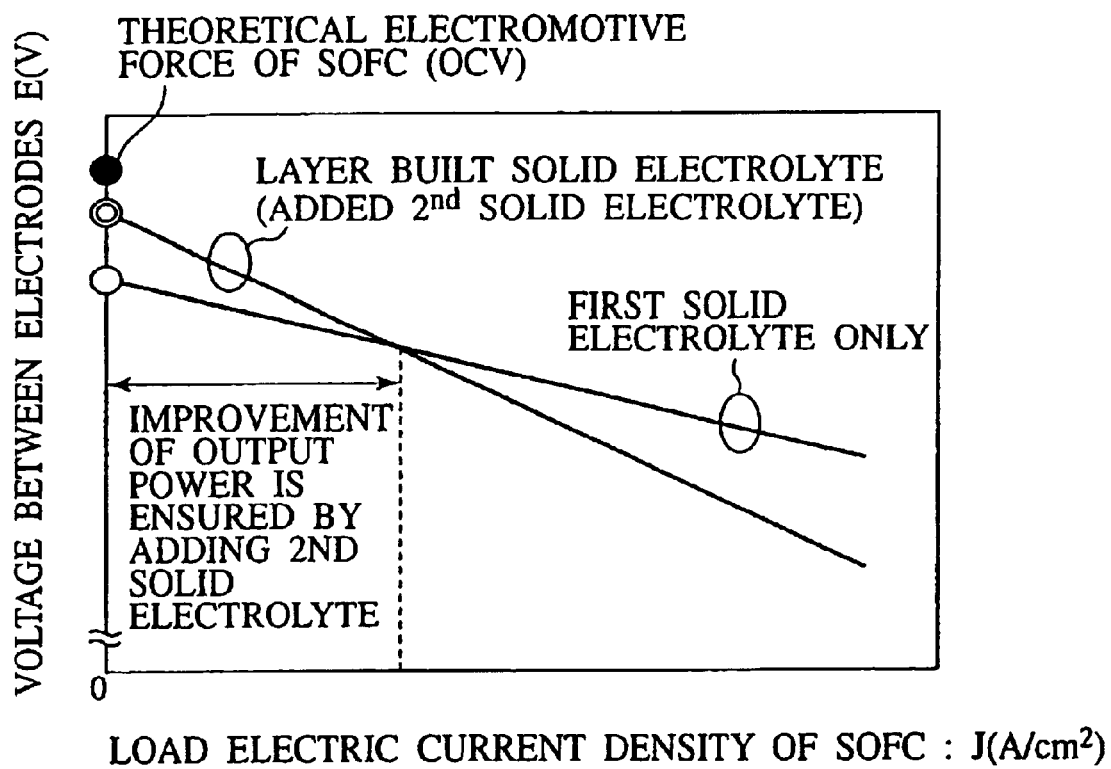
FIG. 2 is a graph showing between J (load electric current density of an SOFC) and E (voltage between electrodes of an SOFC), wherein Ep(J) represents the voltages between electrodes for an SOFC having only first solid electrolyte and Ec(J) represents the voltages between electrodes for an SOFC with first and second solid electrolytes.

According to the formula (f1-5), Lc which represents the thickness of the second solid electrolyte provided between the first solid electrolyte and the air electrode does not depend on the thickness of the first solid electrolyte but depends on the value of J (i.e. load current density). FIG. 2 shows Ep(J) and Ec(J) depended on the value of J. Each SOFC has own values of J. If the value of J is fixed at the level of Jmax that provides the max output power of an SOFC, the second solid electrolyte exhibits usefulness for improving the output power of the SOFC. On the other hand, if the value of E is lower than the max output power of the SOFC, the value of J in the formula (11-5) is less than the Jmax. However, as shown in FIG. 2, if the thickness of the second solid electrolyte (Lc) is fixed at the level to satisfy the formula (f1-5), improvement of the output power of the SOFC is ensured by adding the second solid electrolyte between the first solid electrolyte and the air electrode.

For example, If $La_{0.75}Nd_{0.15}Sr_{0.1}Ga_{0.8}Mg_{0.2}O_{3-d}$ having a thickness of 5 μm is used for the first solid electrolyte layer 2 and YSZ is used for the second solid electrolyte layer 5 and this SOFC is operated with load current density of 1A/cm² at 600° C., the total conductivity and the oxygen ion transport number of the first solid electrolyte layer 2 are about 0.018 S/cm and about 91% respectively and the total conductivity and the oxygen ion transport number of the second solid electrolyte layer 5 are about 0.003 S/cm and about 100% respectively. Thus, considering the foregoing formula, a thickness of the second solid electrolyte layer 5 should preferably be set about 2.7 μm or less.

Next, a method for fabricating the SOFC of the first embodiment described above will be described. The first solid electrolyte layer 2 made of LaGa-based perovskite solid electrolyte can be formed using a sintering method. Specifically, a raw material is mixed with a solvent and ground with a ball mill. After drying, the material is put into a metallic mold and pressed, and then sintered at about 1300° C. to 1500° C. The YSZ for the second solid electrolyte layer 5 may be deposited onto one surface of the first solid electrolyte layer 2 using one of various methods including RF sputtering, CVD, printing, and so on. Further, a porous and conductive air electrode with oxidation resistance is provided on the upper surface of the second solid electrolyte layer 5 using a method such as RF sputtering, printing or the like. A similarly porous and conductive fuel electrode with reduction resistance is provided onto the other surface of the first solid electrolyte layer 2 not having had second solid electrolyte layer 5 formed thereon. For the air electrode and the fuel electrode, materials such as Pt/Ag or the like can be used.

Sintering is not the only method which can be used to form the first solid electrolyte layer 2 made of LaGa-based perovskite solid electrolyte. Various other methods including sputtering, CVD, printing, and so on, are possible. Regarding the order of formation, the second solid electrolyte layer 5 may be formed onto the solid electrolyte layer 2 made of a perovskite compound. Alternatively, the second solid electrolyte layer may be formed onto the air electrode 3, and then the first solid electrolyte (perovskite compound) may be formed thereon.

(Second Embodiment)

The SOFC of the second embodiment has a structure where a third solid electrolyte layer having a low ratio of electron conduction (i.e. electron transport number) and proton (mainly $H^+$) conduction (i.e. proton transport number) and higher ratio of conduction by means of oxygen ions (i.e. oxygen ion transport number) is provided between the fuel electrode and the first a solid electrolyte layer. In other words, the SOFC of the second embodiment is characterized by the use of a laminated solid electrolyte in which the perovskite solid electrolyte layer and the solid electrolyte layer (having low electron and proton transport numbers and high oxygen ion transport number) are laminated.

Figure 3A:
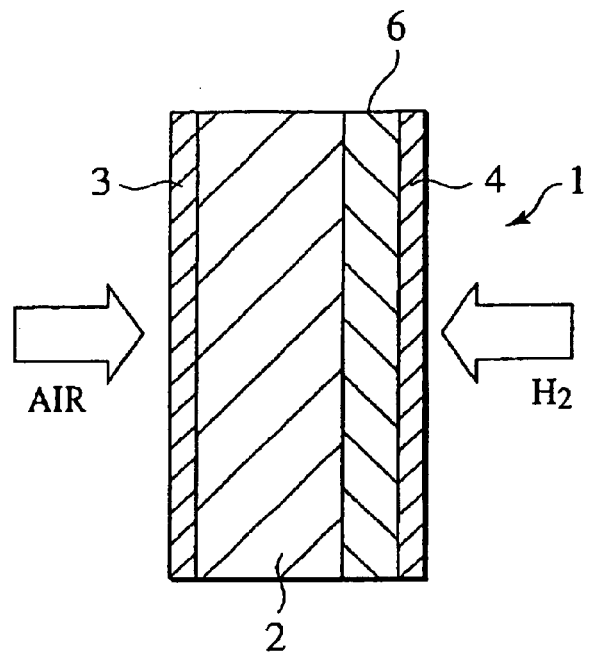
FIG. 3A is a sectional view showing the structure of an SOFC according to the second embodiment of the present invention.

FIG. 3A shows the SOFC of the second embodiment of the present invention. As shown in FIG. 3A, the SOFC 1 of the second embodiment comprises a perovskite solid electrolyte layer as a first solid electrolyte layer 2; an air electrode 3 formed on one surface of the first solid electrolyte layer; a fuel electrode 4 formed on the opposite side thereof; with a third solid electrolyte layer 6 having low electron and proton transport numbers and high oxygen ion transport number provided between the first solid electrolyte layer 2 and the fuel electrode 4.

In the case described here, for the first solid electrolyte layer 2, as with the SOFC of the first embodiment, an LaGa-based perovskite compound can be used. For the third solid electrolyte layer 6, stabilized zirconia or a ceria-based oxide can be used. For example, YSZ prepared by adding yttria (Y2O3) to zirconia (ZrO2) or CSZ prepared by adding calcia (CaO) to zirconia can be used. Other than these, stabilized zirconia prepared by adding such an oxide as samarium (Sm), scandium (Sc) or the like to zirconia can be used. Two or more kinds of oxides may be added to zirconia. As the ceria-based oxide, for example, SDC represented by (CeO2)1−x(MO1.5)x can be used. Here, M is a rare earth element or Ca, and x should preferably be set in a range of 0.1 to 0.3.

Figure 3B:
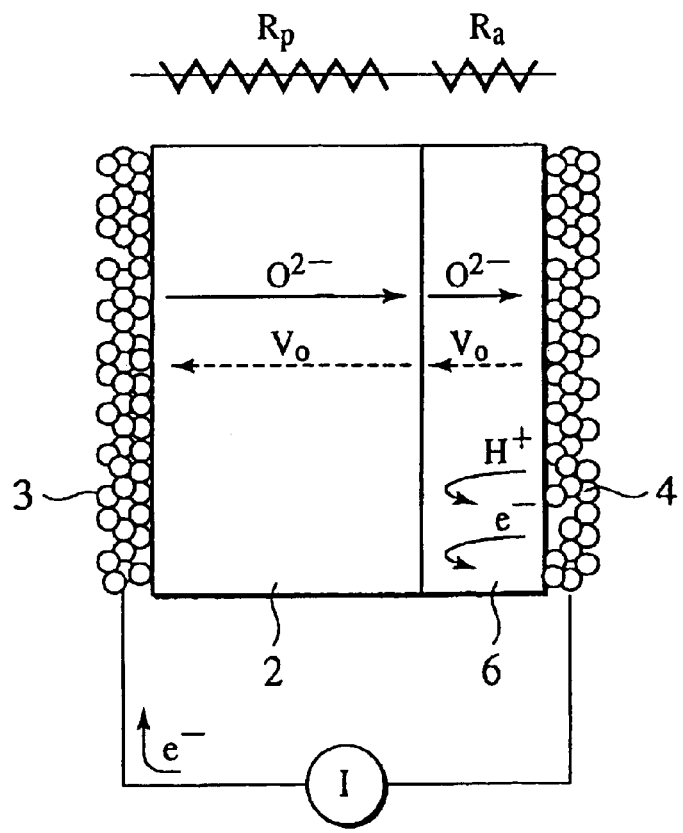
FIG. 3B is a conceptual view showing the movement of conductive carriers and the presence of resistance in a solid electrolyte according to the second embodiment of the present invention.

Preferably, the operation temperature of the SOFC should be fixed e.g. at about 600° C. or lower, to use metallic material as a peripheral material of the SOFC. Under such operational conditions, since the third solid electrolyte layer 6 is made of a material having lower electron and proton transport numbers compared with those of the first solid electrolyte layer 2, the movement of electrons ($e^-$) generated between the fuel electrode 4 and the third solid electrolyte layer 6, and the conduction of hydrogen ions ($H^+$) supplied to the fuel electrode 4 are suppressed by the third solid electrolyte layer 6. Thus, as shown in FIG. 3B, mixed conductivity of the entire laminated solid electrolyte is suppressed, and an oxygen ion $O^{2-}$ passing through an oxygen hole Vo is made to be a primary conductive carrier. In other words, other than the oxygen ions conductivity between the electrodes is suppressed, enabling a substantial improvement to be made in the oxygen ion transport number of the entire laminated solid electrolyte composed of the first and second solid electrolyte layers. As a result, it is possible to prevent polarization resistance between the electrodes caused by the reaction of a formula (f-2b) or the conduction of an electron/proton.

However, if the third solid electrolyte layer 6 is too thick, the resistance oxygen ion conduction of the entire laminated solid electrolyte to is increased and the substantial conductivity of oxygen ions is lowered. It is therefore preferred that a thickness of the third solid electrolyte layer 6 should be fixed at such a level as to ensure lower resistance to oxygen ion conduction compared at least with the first solid electrolyte layer 2.

That is, if the resistance of a single first solid electrolyte layer 2 to oxygen ion conduction per unit area is Rp(o), and resistance of a single third solid electrolyte layer 6 to oxygen ion conduction per unit area is Ra(o), the formula (f2-1) below should preferably be satisfied:

$$Rp(o) > Ra(o) \tag{f2-1}$$

Rp(o) and Ra(o) are represented respectively by the equations below:

$$Rp(o) = Lp/(tpo \cdot \sigma p)$$

$$Ra(o) = La/(tao \cdot \sigma a)$$

Here,

Lp: thickness of first solid electrolyte layer

σp: oxygen ion conductivity of first solid electrolyte layer tpo: oxygen ion transport number of first solid electrolyte layer La: thickness of third solid electrolyte layer σa: oxygen ion conductivity of third solid electrolyte layer tao: oxygen ion transport number of third solid electrolyte layer Thus, (f2-1) can be rewritten into the formula (f2-2) below:

$$Lp/(tpo \cdot \sigma p) > Lc/(tao \cdot \sigma a) \tag{f2-2}$$

Further, to ensure increased output efficiency compared with conventional SOFCs (which use only the first solid electrolyte layer), each thickness should preferably be adjusted in such a way as to fix the voltage-drop for the oxygen ion conduction of electrolytes, which caused by providing a third solid electrolyte 6 between a first solid electrolyte 2 and a fuel electrode 4, at a level lower than the OCV (open end voltage) drop caused by the suppression of the mixed conduction.

Here, if Ep(J), Ea(J) and Eo represent the followings respectively:

Ep(J): voltage between electrodes for the SOFC with only first solid electrolyte when the load current density J is provided;

Ea(J): voltage between electrodes for the SOFC with first and third solid electrolytes when the load current density J is provided;

Eo: theoretical value of OCV for the SOFC

According to the formula (f-5), Ep(J), Ea(J) are expressed by the following formula (f2-3), (f2-4) respectively:

$$Ep(J)=tpo·E0-J·Lp/(tpo·op) \quad (f2-3)$$

$$Ea(J)=tao·E0-J·(Lp/(tpo·op)+La/(tao·oa)) \quad (f2-4)$$

Therefore the formula below should be satisfied:

$$Ep(J)<Ea(J)$$

$$tpo·E0-J·Lp/(tpo·op)<tao·E0-J·(Lp/(tpo·op)+La/(tao·oc))$$

$$J·(Lp/(tpo·op)+La/(tao·oc))-J·Lp/(tpo·op)<tao·E0-tpo·E0$$

$$J·La/(tao·oa)<(tao-tpo)·E0$$

Consequently the formula (f2-5) is obtained.

$$La<tao·oa·(tao-tpo)·E0/J \quad (f2-5)$$

According to the formula (f2-5), La which represents the thickness of the third solid electrolyte provided between the first solid electrolyte and the fuel electrode does not depend on the thickness of the first solid electrolyte but depends on the value of J (load current density). Each SOFC has own values of J. If the value of J is fixed at the level of Jmax that provides the max output power of the SOFC, the second solid electrolyte exhibits usefulness for improving the output power of the SOFC.

On the other hand, if the value of the voltage between electrodes is lower than the max output power of the SOFC, the value of J in the formula (f2-5) is less than the Jmax. However, if the thickness of the third solid electrolyte (La) is fixed at the level to satisfy the formula (f2-5), improvement of the output power of the SOFC is ensured by adding the third solid electrolyte between the first solid electrolyte and the fuel electrode.

The SOFC of the above-described second embodiment can be fabricated using a method similar to that for the SOFC of the first embodiment. Specifically, the first solid electrolyte layer 2 made of LaGa-based perovskite solid electrolyte can be formed using the common sintering method. However, sintering is not the only method that can be used. Various other methods including sputtering, CVD, printing, and so on, are possible. The third solid electrolyte layer 6 made of YSZ or the like can also be formed using various methods including RF sputtering, CVD, printing, and so on. Regarding the order of formation, the third solid electrolyte layer 6 may be formed on the solid electrolyte layer 2 made of a perovskite compound. Alternatively, the third solid electrolyte layer 6 may be formed onto the fuel electrode 4, and then the first solid electrolyte layer (perovskite compound) 2 may be formed thereon.

(Third Embodiment)

The SOFC of the third embodiment has a structure where a second solid electrolyte layer having a low ratio of hole conduction (i.e. hole transport number) and high ratio of oxygen ion conduction (i.e. oxygen ion transport number) is provided between an air electrode and a solid electrolyte, and a third solid electrolyte layer having a low ratio of electron and proton conduction (i.e. electron and proton transport numbers) and high ratio of oxygen ion conduction (i.e. oxygen ion transport number) is provided between a fuel electrode and the first solid electrolyte layer. In other words, the SOFC of the third embodiment is characterized by the use of a laminated solid electrolyte in which the second solid electrolyte layer having a small hole transport number and high oxygen ion transport number, the first perovskite solid electrolyte layer, and the third solid electrolyte layer having small electron and proton transport numbers and high oxygen ion transport number, are laminated.

Figure 4A:
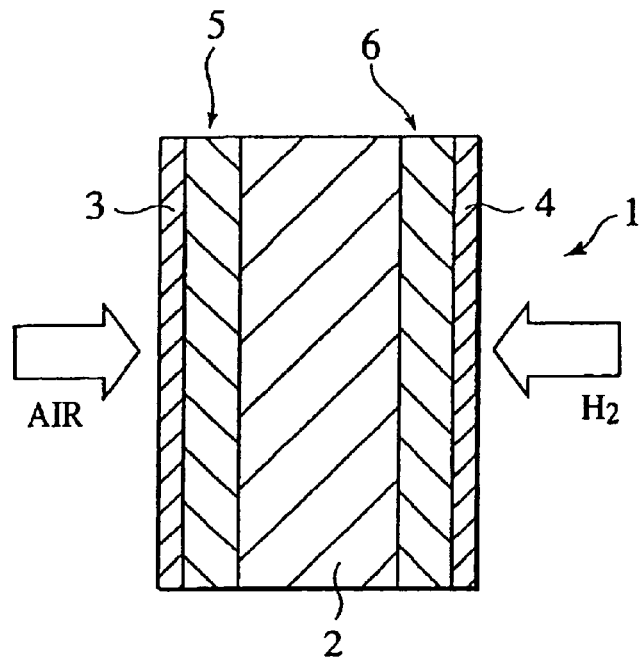
FIG. 4A is a sectional view showing the structure of an SOFC according to the third embodiment of the present invention.

FIG. 4A shows the SOFC of the third embodiment of the present invention. As shown in FIG. 4A, the SOFC 1 of the third embodiment comprises: a perovskite solid electrolyte layer as a first solid electrolyte layer 2; an air electrode 3 formed on one side of the first solid electrolyte layer 2; a fuel electrode 4 formed on the opposite side thereof; with a second solid electrolyte layer 5 having a small hole transport number provided between the first solid electrolyte layer 2 and the air electrode 3; and a third solid electrode layer 6 having small electron and proton (mainly H$^+$) transport numbers and provided between the first solid electrolyte layer 2 and the fuel electrode 4.

In the case described here, for the first to third solid electrolyte layers 2, 5 and 6, materials similar to those in the first and second embodiments can be used. Similar or different materials may be used for the second and third solid electrolyte layers 5 and 6.

Figure 4B:
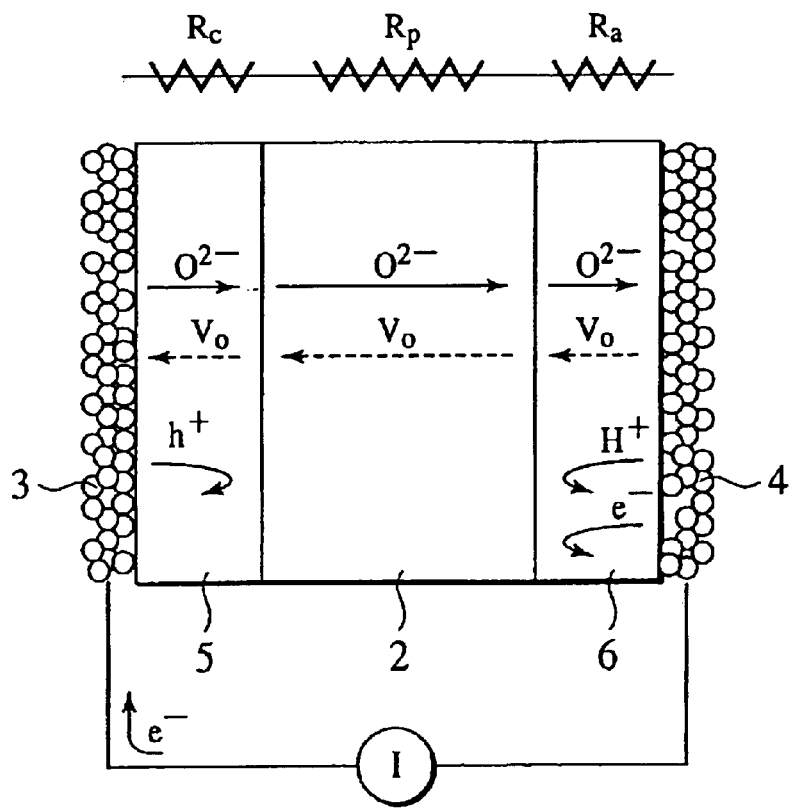
FIG. 4B is a conceptual view showing the movement of conductive carriers and the presence of resistance in a solid electrolyte according to the third embodiment of the present invention.

Preferably, the operation temperature of the SOFC should be fixed e.g. at about 600° C. or lower to enable metallic material to be used as peripheral material of the SOFC. At such an operation temperature, as shown in FIG. 4B, the presence of the second solid electrolyte layer 5 suppresses the movement of holes (h$^+$) generated between the air electrode 3 and the solid electrolyte, and the presence of the third solid electrolyte layer 6 suppresses the movement of an electron and protons (H$^+$). Hence, mixed conductivity of the entire laminated solid electrolyte can be effectively prevented. In other words, the oxygen ion transport number of the entire laminated solid electrolyte is improved.

However, as described above with reference to the first and second embodiments, if the second and third solid electrolyte layers 5 and 6 are too thick, the resistance of the entire laminated solid electrolyte to oxygen ion conduction is increased and the substantial amount of oxygen ion conduction is lowered. To obtain higher output efficiency, the oxygen ion transport number of the entire laminated solid electrolyte and the amount of oxygen ion conduction should preferably be increased.

It is therefore preferred that the resistance to oxygen ion conduction of the entire laminated solid electrolyte composed of the first to third electrolyte layers is fixed at a level of at least lower than that of a single first solid electrolyte layer 2.

That is, if the resistance to oxygen ion conduction of a single first solid electrolyte layer 2 per unit area is Rp(o), resistance of a single second solid electrolyte layer 5 to oxygen ion conduction per unit area is Ra(o), and resistance of a single third solid electrolyte layer 6 to oxygen ion conduction per unit area is Ra(o), the formula (f3-1) below should preferably be satisfied:

$$Rp(o)>Rc(o)+Ra(o) \quad (f3-1)$$

Rp(o) and Ra(o) are represented respectively by the equations below:

$$Rp(o)=Lp/(tpo·op)$$

$$Rc(o)=Lc/(tco·oc)$$

$$Ra(o)=La/(tao·oa)$$

Here,

Lp: thickness of first solid electrolyte layer

σp: oxygen ion conductivity of first solid electrolyte layer tpo: oxygen ion transport number of first solid electrolyte layer Lc: thickness of second solid electrolyte layer σc: oxygen ion conductivity of second solid electrolyte layer tco: oxygen ion transport number of second solid electrolyte layer La: thickness of third solid electrolyte layer σa: oxygen ion conductivity of third solid electrolyte layer tao: oxygen ion transport number of third solid electrolyte layer Thus, (f3-1) can be rewritten into the formula (f3-2) below:

$$Lp/(tpo \cdot \sigma p) > Lc/(tco \cdot \sigma p) + La/(tao \cdot \sigma a) \quad (f3-2)$$

Further, to ensure increased output efficiency compared with conventional SOFCs (which use only the first solid electrolyte layer), each thickness should preferably be adjusted in such a way as to fix the voltage-drop for the oxygen ion conduction of electrolytes, which caused by providing a second solid electrolyte between a first solid electrolyte and an air electrode and the third solid electrolyte between the first solid electrolyte and a fuel electrode, at a level lower than the OCV-drop caused by the suppression of the mixed conduction.

Here, if Ep(J), Ec+a(J) and Eo represent the followings respectively:

Ep(J): voltage between electrodes for the SOFC with only first solid electrolyte when the load current density J is provided;

Ec+a(J): voltage between electrodes for the SOFC with first, second and third solid electrolytes when the load current density J is provided;

Eo: theoretical value of OCV for the SOFC

According to the formula (f-5), Ep(J), Ec+a(J) are expressed by the following formula (f3-3), (f3-4) respectively:

$$Ep(J) = tpo \cdot E0 - J \cdot Lp/(tpo \cdot \sigma p) \quad (f3-3)$$

$$Ec+a(J) = tcao \cdot E0 - J \cdot (Lp/(tpo \cdot \sigma p) + Lc/(tco \cdot \sigma c) + La/(tao \cdot \sigma a)) \quad (f3-4)$$

Here, tcao represents the oxygen ion transport number value which is smaller of tco or tao.

Therefore the formula below should be satisfied:

$$Ep(J) < Ec+a(J)$$

$$tpo \cdot E0 - J \cdot Lp/(tpo \cdot \sigma p) < tcao \cdot E0 - J \cdot (Lp/(tpo \cdot \sigma p) + Lc/(tco \cdot \sigma c) + La/(tao \cdot \sigma a))$$

$$tcao \cdot E0 - tpo \cdot E0 > J \cdot (Lp/(tpo \cdot \sigma p) + Lc/(tco \cdot \sigma c) + La/(tao \cdot \sigma a)) - J \cdot LP/(tpo \cdot \sigma p)$$

Consequently the formula (f3-5) is obtained.

$$(tcao - tpo) \cdot E0 > J \cdot (Lc/(tco \cdot \sigma c) + La/(tao \cdot \sigma a)) \quad (f3-5)$$

According to the formula (f3-5), the thickness of respective the second and the third solid electrolytes do not depend on the thickness of the first solid electrolyte but depends on the value of J (load current density). Each SOFC has own values of J. If the value of J is fixed at the level of Jmax that provides the max output power of the SOFC, the second and third solid electrolytes exhibit usefulness for improving the output power of the SOFC. On the other hand, if the value of the voltage between electrodes is lower than the max output power of the SOFC, the value of J in the formula (f3-5) is less than Jmax. However, if the thickness of the second and third solid electrolytes (Lc, La) are fixed respectively at the level to satisfy the formula (f3-5), improvement of the output power of the SOFC is ensured by adding the second and third solid electrolytes.

The SOFC of the above-described third embodiment can be fabricated using a method similar to that for each of the first and second embodiments. Specifically, the first solid electrolyte layer 2 made of LaGa-based perovskite solid electrolyte can be formed using the common sintering method. However, sintering is not the only method that can be used. Various other methods including sputtering, CVD, printing, and so on, are possible. Also, the second and third solid electrolyte layers 5 and 6 made of YSZ or the like can be formed using various methods including RF sputtering, CVD, printing, and so on. Regarding the order of formation, the first perovskite solid electrolyte layer 2 may be formed first, and then the second and third solid electrolyte layers 5 and 6 may be formed respectively on either surface. Alternatively, the air electrode 3 may be formed first, and then the second solid electrolyte layer 5, the first solid electrolyte (perovskite solid electrolyte) layer 2, and the third solid electrolyte layer 6 may be laminated onto the air electrode 3 in this order. Then again, the third solid electrolyte layer 6, the first electrolyte layer 2, and the second solid electrolyte layer 5 may be formed onto the fuel electrode 4 in this order.

EXAMPLES

Example 1a

An SOFC corresponding to the first embodiment shown in FIG. 1A was fabricated. Specifically, the SOFC was fabricated comprising a second solid electrolyte layer made of yttria stabilized zirconia (YSZ) provided between a first perovskite solid electrolyte layer and an air electrode.

First, using a sintering method, a first solid electrolyte layer made of perovskite solid electrolyte ($La_{0.75}Nd_{0.15}Sr_{0.1}Ga_{0.8}Mg_{0.2}O_{3-d}$) having a diameter of about 15 mmφ and a thickness of about 1 mm was formed. Then, a YSZ layer as a second solid electrolyte layer was formed onto one surface of the first solid electrolyte layer using an RF sputtering method. The thickness of the YSZ layer was fixed at a level so as to satisfy the condition of the formula (f1-6) of the first embodiment.

An air electrode and a fuel electrode composed of Pt/Ag electrodes were formed respectively on the surface of the second solid electrolyte YSZ layer, and on the surface of the perovskite solid electrolyte having no YSZ layer formed thereon.

Then, the measurement of oxygen ion conductivity σ[S/cm] occurred and the oxygen ion transport number TOi[%] of the entire laminated solid electrolyte composed of the foregoing layers was formed. For the oxygen ion conductivity, resistance between the air electrode and the fuel electrode was measured at 600° C. in atmosphere, and an inverse number thereof was fixed as oxygen ion conductivity. For electric conduction in the laminated solid electrolyte, it was assumed that oxygen ion conductivity was 100% at 600° C. in atmosphere. For the oxygen ion transport number, the temperature was increased to 600° C. while supplying Ar gas to the fuel electrode and air electrode sides after the flow of Ar gas was stopped, humidified hydrogen was supplied to the fuel electrode side, and air was supplied to the air electrode side, and then the electrodes were left for 30 mins, and natural potential therebetween was measured. The percentage of the measured value of the natural potential with respect to a theoretical natural potential was set as the oxygen ion transport number.

According to the results of the measurement, the presence of the second solid electrolyte layer composed of a YSZ layer (having an oxygen ion transport number of 99% or higher) between the first perovskite solid electrolyte layer and the air electrode slightly lowered the oxygen ion conductivity of the entire electrolyte. However, the oxygen ion transport number was improved by the suppression of hole conduction. Table 1 shows the result of the measurements.

Example 1b

A first perovskite solid electrolyte layer, $La_{0.8}Sm_{0.1}Ba_{0.1}Ga_{0.8}Mg_{0.2}O_{3-d}$ was formed, but otherwise the SOFC was fabricated under the same conditions as those in example 1a. The oxygen ion conductivity of the entire laminated solid electrolyte was slightly lowered. However, the oxygen ion transport number was improved by the suppression of hole conduction. Table 1 shows the results of the measurement.

Example 2a

An SOFC corresponding to the first embodiment shown in FIG. 1A was fabricated. The SOFC in this example further comprises a second solid electrolyte layer made of $Sm_2O_3$-added ceria oxide (SDC), provided between the first perovskite solid electrolyte layer and the air electrode. Using a sintering method, a perovskite solid electrolyte layer $(La_{0.75}Nd_{0.15}Sr_{0.1}Ga_{0.8}Mg_{0.2}O_{3-d})$ was formed. Then, a second solid electrolyte layer made of SDC was formed onto one surface of the first solid electrolyte layer made of the perovskite compound using a screen printing method. In this case, the thickness of the SDC layer was fixed at a level so as to satisfy the condition of the formula (f1-6) of the first embodiment.

Pt/Ag electrodes were formed on the SDC surface and on the surface of the perovskite solid electrolyte layer. Then, measurements for oxygen ion conductivity $\sigma[S/cm]$ were performed and the oxygen ion transport number TOi[%] the an entire laminated solid electrolyte layer composed of the foregoing layers was formed. The method of measurement used was similar to that in example 1a. According to the result of the measurement, the presence of the SDC layer (having low hole conductivity) between the first solid electrolyte layer and the air electrode slightly lowered the oxygen ion conductivity of the entire laminated solid electrolyte. However, the oxygen ion transport number was improved by the suppression hole conduction. Table 1 shows the results of the measurements.

Example 2b

A first perovskite solid electrolyte layer, $La_{0.8}Sm_{0.1}Ba_{0.1}Ga_{0.8}Mg_{0.2}O_{3-d}$ was formed, but otherwise the SOFC was fabricated under the same conditions as those for the example 2a. The oxygen ion conductivity of the entire laminated solid electrolyte was slightly lowered. However, the oxygen ion transport number was improved by the suppression of hole conduction. Table 1 shows the result of the measurements.

Example 3a

An SOFC corresponding to the second embodiment shown in FIG. 3A was fabricated. The SOFC in this example 3a comprises a third solid electrolyte layer made of YSZ, provided between the first perovskite solid electrolyte layer and the fuel electrode.

Using a sintering method, a perovskite solid electrolyte $(La_{0.75}Nd_{0.15}Sr_{0.1}Ga_{0.8}Mg_{0.2}O_{3-d})$ was formed. Then, a YSZ layer was formed on one surface of the solid electrolyte layer made of the perovskite compound using an RF sputtering method. The thickness of the YSZ layer was fixed at a level to satisfy the condition of the formula (f2-6) of the second embodiment.

Pt/Ag electrodes were formed on the YSZ surface and on the surface of the perovskite solid electrolyte. Then, measurements for oxygen ion conductivity $\sigma[S/cm]$ were taken and the oxygen ion transport number TOi[%] of the entire laminated solid electrolyte composed of the foregoing was formed. The method of measuring oxygen ion conductivity and an oxygen ion transport number was similar to that in example 1a.

According to the result of the measurement, the presence of the YSZ layer (having an oxygen ion transport number of 99% or higher) between the first solid electrolyte layer and the fuel electrode slightly lowered the oxygen ion conductivity of the entire laminated solid electrolyte. However, the oxygen ion transport number was improved by the suppression of electron and proton conduction. Table 1 shows the results of the measurements.

Example 3b

A first perovskite solid electrolyte layer, $La_{0.8}Sm_{0.1}Ba_{0.1}Ga_{0.8}Mg_{0.2}O_{3-d}$ was formed, but otherwise the SOFC was fabricated under the same conditions as those for example 3a. The oxygen ion conductivity of the entire laminated solid electrolyte was slightly lowered. However, the oxygen ion transport number was improved by the suppression of hole conduction. Table 1 shows the results of the measurements.

Example 4a

An SOFC corresponding to the third embodiment shown in FIG. 4A was fabricated. The SOFC of the Example 4a comprises: a second solid electrolyte layer made of YSZ, provided between the first solid electrolyte layer made of a perovskite compound and the air electrode; and the third solid electrolyte layer made of YSZ, provided between the first solid electrolyte layer and the fuel electrode.

Using a sintering method, the first solid electrolyte layer made of a perovskite compound $(La_{0.75}Nd_{0.15}Sr_{0.1}Ga_{0.8}Mg_{0.2}O_{3-d})$ was formed. Then, a YSZ layer was formed on both surfaces of the first solid electrolyte layer made of the perovskite compound by using a screen printing method. The thickness of the YSZ layer was fixed at a level so as to satisfy the conditions of the formula (f3-7) of the third embodiment.

Pt/Ag electrodes 3 and 4 were formed on the surfaces of both YSZ layers. Then, measurements for oxygen ion conductivity $\sigma[S/cm]$ were performed and the oxygen ion transport number TOi[%] was formed. The method of measuring oxygen ion conductivity and finding oxygen ion transport number used here was similar to that in example 1a.

According to the results of the measurements, the presence of the YSZ layers (having oxygen ion transport numbers of 99% or higher) between the first solid electrolyte layer and the air electrode, and between the first solid electrolyte layer and the fuel electrode slightly lowered the oxygen ion conductivity of the entire laminated solid electrolyte. However, the oxygen ion transport number was improved by the suppression of hole, electron and proton conduction. Table 1 shows the results of the measurements.

Example 4b

A first perovskite solid electrolyte layer, $La_{0.8}Sm_{0.1}Ba_{0.1}Ga_{0.8}Mg_{0.2}O_{3-d}$ was formed, but otherwise the SOFC was fabricated under the same conditions as those for example 4a. The oxygen ion conductivity of the entire laminated solid electrolyte was slightly lowered. However, the oxygen ion transport number was improved by the suppression of hole, electron and proton conduction. Table 1 shows the results of the measurements.

Example 5a

An SOFC corresponding to the third embodiment, as shown in FIG. 4A was fabricated. The SOFC of the Example 5a comprises: a second solid electrolyte layer made of SDC, provided between the first solid electrolyte layer made of a perovskite compound and the air electrode; and a third solid electrolyte layer made of YSZ, which is provided between the first solid electrolyte layer and the fuel electrode.

Using a sintering method, a first perovskite solid electrolyte layer ($La_{0.75}Nd_{0.15}Sr_{0.1}Ga_{0.8}Mg_{0.2}O_{3-d-d}$) was formed. An SDC layer was formed on one surface of the first solid electrolyte layer using a screen printing method. A YSZ layer was formed on the other surface of the solid electrolyte layer made of the perovskite compound using an RF sputtering method. The thickness of each of the SDC and YSZ layers was set so as to satisfy the conditions of the formula (f3-7) of the third embodiment. Pt/Ag electrodes 3 and 4 were respectively formed on the surfaces of the SDC and YSZ layers.

Then, measurement, for oxygen ion conductivity $\sigma$[S/cm] were performed and the oxygen ion transport number TOi [%] of the entire laminated solid electrolyte composed of the above layers were formed. The method of measuring oxygen ion conductivity and finding the oxygen ion transport number used here was similar to that in example 1a.

According to the results of the measurement, the presence of the second solid electrode layer made of SDC (having low hole conductivity) between the first solid electrolyte layer and the air electrode, and the presence of the third solid electrolyte layer made of YSZ (having an oxygen ion transport number of 99% or higher) between the first solid electrolyte layer and the fuel electrode, slightly lowered the oxygen ion conductivity of the entire laminated solid electrolyte. However, the oxygen ion transport number was improved by the suppression of hole, electron and proton conduction. Table 1 shows the results of the measurements.

Example 5b

A perovskite solid electrolyte layer, $La_{0.8}Sm_{0.1}Ba_{0.1}Ga_{0.8}Mg_{0.2}O_{3-d}$ was formed, but otherwise the SOFC was fabricated under the same conditions as those in example 5a. The oxygen ion conductivity of the entire laminated solid electrolyte was formed to be slightly lowered. However, the oxygen ion transport number was improved by the suppression of hole, electron and proton conduction. Table 1 shows the results of the measurements.

Comparative Example

As in conventional SOFC production, the inventors fabricated an SOFC using only the solid electrolyte layer made of a perovskite compound. In other words, the SOFC of the Comparative Example had no other solid electrolyte between the solid electrolyte and air electrode, or fuel electrode. Measurements for the oxygen ion conductivity were performed and the oxygen ion transport number of the solid electrolyte layer made of the perovskite compound was formed. Table 1 shows the results of the measurements.

As explained above, since the SOFC using the perovskite solid electrolyte of the present invention has a large oxygen ion transport number under low-temperature operations conditions, the output efficiency of the SOFC is improved. Moreover, by adjusting the thickness of each of the first to third solid electrolyte layers, increases in the resistance of the solid electrolyte are avoided, making it possible to further improve the output efficiency of the SOFC.

TABLE 1

| No. | Layer-built solid electrolyte (2nd SE/1st SE/3rd SE) | Ion conductivity [$\sigma$] | Ion transport number [Toi] |
| --- | --- | --- | --- |
| Example 1-a | YSZ/$La_{0.75}Nd_{0.15}Sr_{0.1}Ga_{0.8}Mg_{0.2}O_{3-d}$ | 0.017 S/cm | 94% |
| Example 1-b | YSZ/$La_{0.8}Sm_{0.1}Ba_{0.1}Ga_{0.8}Mg_{0.2}O_{3-d}$ | 0.017 S/cm | 94% |
| Example 2-a | SDC/$La_{0.75}Nd_{0.15}Sr_{0.1}Ga_{0.8}Mg_{0.2}O_{3-d}$ | 0.018 S/cm | 94% |
| Example 2-b | SDC/$La_{0.8}Sm_{0.1}Ba_{0.1}Ga_{0.8}Mg_{0.2}O_{3-d}$ | 0.018 S/cm | 94% |
| Example 3-a | $La_{0.75}Nd_{0.15}Sr_{0.1}Ga_{0.8}Mg_{0.2}O_{3-d}$/YSZ | 0.017 S/cm | 96% |
| Example 3-b | $La_{0.8}Sm_{0.1}Ba_{0.1}Ga_{0.8}Mg_{0.2}O_{3-d}$/YSZ | 0.017 S/cm | 96% |
| Example 4-a | YSZ/$La_{0.75}Nd_{0.15}Sr_{0.1}Ga_{0.8}Mg_{0.2}O_{3-d}$/YSZ | 0.016 S/cm | 99% |
| Example 4-b | YSZ/$La_{0.8}Sm_{0.1}Ba_{0.1}Ga_{0.8}Mg_{0.2}O_{3-d}$/YSZ | 0.016 S/cm | 99% |
| Example 5-a | SDC/$La_{0.75}Nd_{0.15}Sr_{0.1}Ga_{0.8}Mg_{0.2}O_{3-d}$/YSZ | 0.017 S/cm | 99% |
| Example 5-b | SDC/$La_{0.8}Sm_{0.1}Ba_{0.1}Ga_{0.8}Mg_{0.2}O_{3-d}$/YSZ | 0.017 S/cm | 99% |
| Comparative Example a | $La_{0.75}Nd_{0.15}Sr_{0.1}Ga_{0.8}Mg_{0.2}O_{3-d}$ | 0.018 S/cm | 91% |
| Comparative Example b | $La_{0.8}Sm_{0.1}Ba_{0.1}Ga_{0.8}Mg_{0.2}O_{3-d}$ | 0.018 S/cm | 91% |

The entire contents of Japanese Patent Applications P 2000-202262 (filed Jul. 4, 2000) and P 2001-184558 (filed Jun. 19, 2001) are incorporated herein by reference.

Although the inventions have been described above by reference to certain embodiments of the inventions, the inventions are not limited to the embodiments described above. Modifications and variations of the embodiments described above will occur to those skilled in the art, in light of the above teachings. For example, the solid electrolyte layer is not limited to a plate-like shape and may be cylindrical. Where a plate-like shape is used, the sectional shape thereof may be either circular or rectangular. Further, each of the first to third solid electrolyte layers are not limited to being single layers, and may be plural of layers.

The scope of the inventions is defined with reference to the following claims.

What is claimed is:

1. A solid oxide fuel cell comprising:
   a first perovskite solid electrolyte layer exhibiting mixed conductivity and having oxygen ion conduction which is stronger than electron conduction under operational condition of the solid oxide fuel cell;
   a fuel electrode provided on one surface of the first solid electrolyte layer;
   an air electrode provided on the opposite side of the first solid electrolyte layer; and
   a second solid electrolyte layer provided between the first solid electrolyte layer and the air electrode, and having a lower ratio of conduction by holes and higher ratio of conduction by oxygen ions of the conductive carriers of electrolyte such as ions, electrons, and holes than that of the first solid electrolyte layer under the operational condition of the solid oxide fuel cell.

2. The solid oxide fuel cell according to claim 1, wherein assuming that oxygen ion conductivity, oxygen ion transport number and a thickness of the first solid electrolyte layer are respectively $\sigma p$, $tpo$ and $Lp$, and oxygen ion conductivity, oxygen ion transport number and a thickness of the second solid electrolyte layer are respectively $\sigma c$, $tco$ and $Lc$, the formula below is satisfied:

$$Lp/(tpo \cdot \sigma p) > Lc/(tco \cdot \sigma c).$$

3. The solid oxide fuel cell according to claim 1,
   wherein assuming that $tpo$ is an oxygen ion transport number of the first solid electrolyte layer;
   $\sigma c$, $Lc$ and $tco$ are respectively total conductivity, a thickness and an oxygen ion transport number of the second electrolyte layer;
   $J$, $E0$ are respectively a load electric current density and theoretical value of OCV (Open Circuit Voltage) of the solid oxide fuel cell,
   the formula below is satisfied:

$$J \cdot Lc/(tco \cdot \sigma c) < (tco - tpo) \cdot E0.$$

4. The solid oxide fuel cell according to claim 1,
   wherein the first perovskite solid electrolyte layer is made of an LaGa-based perovskite compound represented by a composition formula of $La_{2-x-y}Ln_xA_yGa_{1-z}B_zO_{3-0.5(x+y+z)}$,
   the Ln is one or more elements selected from the group consisting of Y, Yb, Gd, Sm and Nd,
   the A is one or more elements selected from the group consisting of Sr, Ba, and Ca,
   the B is one or two elements selected from the group consisting of Mg and Zn, and
   the x is set in a range of 0.05 to 0.15, y in a range of 0.05 to 0.15, and z in the range a 0.05 to 0.25.

5. The solid oxide fuel cell according to claim 1, wherein the second solid electrolyte layer is made of stabilized zirconia, or alternatively a ceria based oxide.

6. A solid oxide fuel cell comprising:
   a first perovskite solid electrolyte layer;
   an air electrode provided on one surface of the first solid electrolyte layer;
   a fuel electrode provided on the opposite side of the first solid electrolyte layer; and
   a second solid electrolyte layer provided between the first solid electrolyte layer and the fuel electrode and having a lower ratio of conduction by electrons and protons and higher ratio of conduction by oxygen ions of the conductive carriers of electrolyte such as ions, electrons, and holes than that of the first solid electrolyte layer, under the operational condition of the solid oxide fuel cell.

7. The solid oxide fuel cell according to claim 6,
   wherein assuming that oxygen ion conductivity, oxygen ion transport number and the thickness of the first solid electrolyte layer are respectively $\sigma p$, $tpo$ and $Lp$, and
   oxygen ion conductivity, oxygen ion transport number and the thickness of the second solid electrolyte layer are respectively $\sigma a$, $tao$ and $La$, the formula below is satisfied:

$$Lp/(tpo \cdot \sigma p) > La/(tao \cdot \sigma a).$$

8. The solid oxide fuel cell according to claim 6,
   wherein assuming that $tpo$ is an oxygen ion transport number of the first solid electrolyte layer;
   $\sigma a$, $La$ and $tao$ are respectively total conductivity, a thickness and an oxygen ion transport number of the second electrolyte layer;
   $J$, $E0$ are respectively a load electric current density and theoretical value of OCV (Open Circuit Voltage) of the solid oxide fuel cell,
   the formula below is satisfied:

$$J \cdot La/(tao \cdot \sigma a) < (tao - tpo) \cdot E0.$$

9. The solid oxide fuel cell according to claim 6,
   wherein the first perovskite solid electrolyte layer is made of an LaGa based perovskite compound represented by a composition formula of $La_{2-x-y}Ln_xA_yGa_{1-z}B_zO_{3-0.5(x+y+z)}$,
   the Ln is one or more elements selected from the group consisting of Y, Yb, Gd, Sm, and Nd,
   the A is one or more elements selected from the group consisting of Sr, Ba, and Ca,
   the B is one or two elements selected from the group consisting of Mg and Zn, and
   the x is set in a range of 0.05 to 0.15, the y in a range of 0.05 to 0.15, and the z in a range of 0.05 to 0.25.

10. The solid oxide fuel cell according to claim 6, wherein the second solid electrolyte layer is made of stabilized zirconia, alternatively a ceria based oxide.

11. A solid oxide fuel cell comprising:
    a first perovskite solid electrolyte layer;
    an air electrode provided on one side of the first solid electrolyte layer;
    a fuel electrode provided on the opposite side of the first solid electrolyte layer;
    a second solid electrolyte layer provided between the first solid electrolyte layer and the air electrode and having a lower ratio of conduction by holes and higher ratio of conduction by oxygen ions of the conductive carriers of electrolyte such as ions, electrons, and holes than that of the first solid electrolyte layer under the operational condition of the solid oxide fuel cell; and a third solid electrolyte layer provided between the first solid electrolyte layer and the fuel electrode and having a lower ratio of conduction by electrons and hydrogen ions and higher ratio of conduction by oxygen ions of the conductive carriers of electrolyte such as ions, electrons, and holes than that of the first solid electrolyte layer under the operational condition of the solid oxide fuel cell.

12. The solid oxide fuel cell according to claim 11, wherein assuming that oxygen ion conductivity, oxygen ion transport number and the thickness of the first solid electrolyte layer are respectively $\sigma p$, tpo and Lp, oxygen ion conductivity, oxygen ion transport number and the thickness of the second solid electrolyte layer are respectively $\sigma c$, tco and Lc, and oxygen ion conductivity, oxygen ion transport number and the thickness of the third electrolyte layer are respectively $\sigma a$, tao and La, the formula below is satisfied:

$$Lp/(tpo \cdot \sigma p) > Lc/(tco \cdot \sigma c) + La/(tao \cdot \sigma a).$$

13. The solid oxide fuel cell according to claim 11, wherein assuming that tpo is an oxygen ion transport number of the first solid electrolyte layer;

$\sigma c$, Lc and tco are respectively total conductivity, a thickness and an oxygen ion transport number of the second electrolyte layer;

$\sigma a$, La and tao are respectively total conductivity, a thickness and an oxygen ion transport number of the third electrolyte layer;

tcao is smaller oxygen ion transport number of tco or tao;

J, E0 are respectively a load electric current density and theoretical value of OCV (Open Circuit Voltage) of the solid oxide fuel cell, the formula below is satisfied:

$$(tcao-tpo) \cdot E0 > J \cdot (Lc/(tco \cdot \sigma c) + La/(tao \cdot \sigma a)).$$

14. The solid oxide fuel cell according to claim 11, wherein the perovskite solid electrolyte is made of an LaGa-based perovskite compound represented by a composition formula of $La_{2-x-y}Ln_xA_yGa_{1-z}B_zO_{3-0.5(x+y+z)}$, the Ln is one or more elements selected from the group consisting of Y, Yb, Gd, Sm, and Nd, the A is one or more elements selected from the group consisting of Sr, Ba, and Ca, the B is one or two elements selected from the group consisting of Mg and Zn, and the x is set in a range of 0.05 to 0.15, the y in the a range of 0.05 to 0.15, and the z in a range of 0.05 to 0.25.

15. The solid oxide fuel cell according to claim 11, wherein the second solid electrolyte layer is made of stabilized zirconia, or alternatively a ceria-based compound, and the third solid electrolyte layer is made of stabilized zirconia, or alternatively a ceria-based compound.

* * * * *